US012056309B2

(12) United States Patent
Lee et al.

(10) Patent No.: US 12,056,309 B2
(45) Date of Patent: Aug. 6, 2024

(54) ELECTRONIC DEVICE AND DRIVING METHOD OF THE SAME FOR IMPPROVING SENSITIVITY VALUES USING ADJACENT NODES

(71) Applicant: SAMSUNG DISPLAY CO., LTD., Yongin-si (KR)

(72) Inventors: Eungkwan Lee, Hwaseong-si (KR); Hyun-Wook Cho, Yongin-si (KR); Sangkook Kim, Cheonan-si (KR); Taejoon Kim, Seongnam-si (KR); Jeongheon Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/053,509

(22) Filed: Nov. 8, 2022

(65) Prior Publication Data

US 2023/0176676 A1 Jun. 8, 2023

(30) Foreign Application Priority Data

Dec. 7, 2021 (KR) .......................... 10-2021-0173896

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0416* (2013.01);
(Continued)

(58) Field of Classification Search
CPC ...... G06F 3/0416; G06F 3/0446; G06F 3/041; G06F 3/0412; G06F 3/04164;
(Continued)

(56) References Cited

U.S. PATENT DOCUMENTS 8,659,557 B2 * 2/2014 Simmons .............. G06F 3/0416
345/173
8,860,684 B1 * 10/2014 Gandhi ............... G06F 3/04164
178/18.08

(Continued)

FOREIGN PATENT DOCUMENTS

KR  10-1036802  5/2011
KR  10-20130099420  9/2013
(Continued)

*Primary Examiner* — Darlene M Ritchie
(74) *Attorney, Agent, or Firm* — F. Chau & Associates, LLC

(57) ABSTRACT

An electronic device includes a display layer, a sensor layer, and a sensor driver that receives a sensitivity value from a node defined in an area where one electrode intersects one cross electrode, and calculates an input coordinate based on the sensitivity value. When the sensitivity value received from the node is equal to or greater than a first threshold value, the sensor driver calculates the input coordinate based on the sensitivity value. When each of a plurality of sensitivity values received from the node and a plurality of peripheral nodes adjacent to the node is less than the first threshold value and greater than or equal to a second threshold value, the sensor driver calculates the input coordinate based on the plurality of sensitivity values.

17 Claims, 14 Drawing Sheets

(52) U.S. Cl.
CPC ........ *G06F 3/04186* (2019.05); *G06F 3/0443* (2019.05); *G06F 3/0446* (2019.05); *G06F 2203/04111* (2013.01)

(58) Field of Classification Search
CPC ............ G06F 3/04166; G06F 3/04186; G06F 3/0443; G06F 3/0445; G06F 2203/04111; G06F 2203/04112; G09F 9/33; G09F 9/335
See application file for complete search history.

(56) References Cited

U.S. PATENT DOCUMENTS

| | | | |
|---|---|---|---|
| 9,256,328 B2* | 2/2016 | Kwon | .................... G06F 3/0445 |
| 10,345,974 B2* | 7/2019 | Nakao | ................ G06F 3/041662 |
| 2013/0222337 A1 | 8/2013 | Lee | |
| 2015/0242052 A1* | 8/2015 | Gao | ...................... G06F 3/0446 |
| | | | 345/178 |
| 2016/0283037 A1* | 9/2016 | Ng | ........................ G06F 3/0446 |
| 2018/0292922 A1* | 10/2018 | Yeh | ......................... G06F 3/044 |

FOREIGN PATENT DOCUMENTS

| | | |
|---|---|---|
| KR | 10-1549213 | 9/2015 |
| KR | 10-2010796 | 8/2019 |
| KR | 10-2021-0033299 | 3/2021 |

* cited by examiner

ELECTRONIC DEVICE AND DRIVING METHOD OF THE SAME FOR IMPPROVING SENSITIVITY VALUES USING ADJACENT NODES

CROSS-REFERENCE TO RELATED APPLICATIONS

This application claims priority under 35 U.S.C. § 119 to Korean Patent Application No. 10-2021-0173896, filed on Dec. 7, 2021 in the Korean Intellectual Property Office, the disclosure of which is incorporated by reference herein in its entirety.

TECHNICAL FIELD

Embodiments of the present disclosure described herein relate to an electronic device capable of increasing touch sensitivity and a method of driving the electronic device.

DISCUSSION OF RELATED ART

Multimedia electronic devices such as a television, a mobile phone, a tablet computer, a navigation system, a game console, etc., may display an image, and may provide, in addition to a general input method such as a button, a keyboard, a mouse, etc., a touch-based input method that allows a user to enter information or commands easily and intuitively.

SUMMARY

Embodiments of the present disclosure provide an electronic device capable of increasing touch sensitivity and a method of driving the electronic device.

According to an embodiment of the present disclosure, an electronic device includes a display layer that displays an image, a sensor layer disposed on the display layer and including a plurality of electrodes arranged in a first direction and a plurality of cross electrodes arranged in a second direction crossing the first direction, and a sensor driver that receives a sensitivity value from a node defined in an area where one of the plurality of electrodes intersects one of the plurality of cross electrodes, and calculates an input coordinate based on the sensitivity value. The sensor driver, when the sensitivity value received from the node is equal to or greater than a first threshold value, calculates the input coordinate based on the sensitivity value, and when each of a plurality of sensitivity values received from the node and a plurality of peripheral nodes adjacent to the node is less than the first threshold value and greater than or equal to a second threshold value different from the first threshold value, calculates the input coordinate based on the plurality of sensitivity values.

According to an embodiment, the number of the node and the plurality of peripheral nodes may be 4.

According to an embodiment, the plurality of peripheral nodes may include a first peripheral node, a second peripheral node, and a third peripheral node. The first peripheral node may be disposed adjacent to the node in the first direction, the second peripheral node may be disposed adjacent to the node in the second direction, and the third peripheral node may be disposed adjacent to the first peripheral node in the second direction and disposed adjacent to the second peripheral node in the first direction.

According to an embodiment, the sensor driver may include an average calculator that calculates an average sensitivity value of the sensitivity values received from the node and the peripheral nodes, a weight calculator that calculates weights of the node and the plurality of peripheral nodes based on the average sensitivity value, and a coordinate calculator that calculates the input coordinate based on the weights.

According to an embodiment, each of the weights may be calculated by the following equation: weight=(sensitivity value−average sensitivity value)*(PT/average sensitivity value), where PT is a pitch between the plurality of electrodes.

According to an embodiment, a distance between a position of the input coordinate and a center of the node, and a distance between the position of the input coordinate and a center of each of the plurality of peripheral nodes, may be greater than 0, and may be less than a value obtained by multiplying the PT by a square root of 2.

According to an embodiment, the coordinate calculator may calculate the input coordinate by reflecting the weights from a center of the node and centers of the plurality of peripheral nodes, respectively.

According to an embodiment, a position of the input coordinate may be spaced apart from the center of the node in a direction toward the plurality of peripheral nodes.

According to an embodiment, the sensor driver may include a determination circuit that determines whether the sensitivity value received from the node is less than the first threshold value and greater than or equal to the second threshold value. When the sensitivity value is less than the first threshold value and greater than or equal to the second threshold value, the input coordinate may be calculated based on the sensitivity values received from the node and the plurality of peripheral nodes.

According to an embodiment, the second threshold value may be less than the first threshold value and equal to or greater than about ⅔ of the first threshold value.

According to an embodiment of the present disclosure, a method of driving an electronic device includes receiving a plurality of sensitivity values of a plurality of nodes from a sensor layer including the plurality of nodes, determining whether each of the plurality of sensitivity values is less than a first threshold value and greater than or equal to a second threshold value that is less than the first threshold value, and when four adjacent sensitivity values respectively received from four adjacent nodes among the plurality of nodes are less than the first threshold value and greater than or equal to the second threshold value, calculating an input coordinate based on the four adjacent sensitivity values.

According to an embodiment, the method of driving the electronic device may further include calculating the input coordinate based on sensitivity values equal to or greater than the first threshold value among the sensitivity values.

According to an embodiment, calculating the input coordinate may include calculating an average sensitivity value of the four adjacent sensitivity values respectively received from the four adjacent nodes, calculating four weights of the four adjacent nodes based on the average sensitivity value, and calculating the input coordinate based on the four weights.

According to an embodiment, each of the weights may be calculated by the following equation: weight=(sensitivity value−average sensitivity value)*(PT/average sensitivity value), where the PT is a width of each of the plurality of nodes.

According to an embodiment, the second threshold value may be less than the first threshold value and equal to or greater than about ⅔ of the first threshold value.

According to an embodiment, the sensor layer may further include a plurality of electrodes arranged in a first direction and a plurality of cross electrodes arranged in a second direction intersecting the first direction. Each of the plurality of nodes may be defined by an area in which one electrode of the plurality of electrodes intersects one cross electrode of the plurality of cross electrodes. The four adjacent nodes may include a node, a first peripheral node, a second peripheral node, and a third peripheral node. The first peripheral node may be disposed adjacent to the node in the first direction, the second peripheral node may be disposed adjacent to the node in the second direction, and the third peripheral node may be disposed adjacent to the first peripheral node in the second direction and disposed adjacent to the second peripheral node in the first direction.

According to an embodiment of the present disclosure, an electronic device includes a display layer that displays an image, a sensor layer disposed on the display layer and including a plurality of nodes, and a sensor driver that receives a sensitivity value from each of the plurality of nodes and calculates an input coordinate based on the sensitivity value. When the sensitivity value is equal to or greater than a first threshold value, the sensor driver calculates a first input coordinate based on the sensitivity value. When the sensitivity value is less than the first threshold value and greater than or equal to a second threshold value different from the first threshold value, the sensor driver calculates a second input coordinate based on the sensitivity value, and peripheral sensitivity values received from a plurality of peripheral nodes disposed adjacent to a node providing the sensitivity value among the plurality of nodes.

According to an embodiment, the sensor driver may include an average calculator that calculates an average sensitivity value of the sensitivity value and the peripheral sensitivity values, a weight calculator that calculates weights of the node and the plurality of peripheral nodes based on the average sensitivity value, and a coordinate calculator that calculates the second input coordinate based on the weights.

According to an embodiment, each of the weights may be calculated by the following equation: weight=(sensitivity value−average sensitivity value)*(PT/average sensitivity value), where the PT is a width of each of the plurality of nodes.

According to an embodiment, the second threshold value may be less than the first threshold value and equal to or greater than about ⅔ of the first threshold value.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
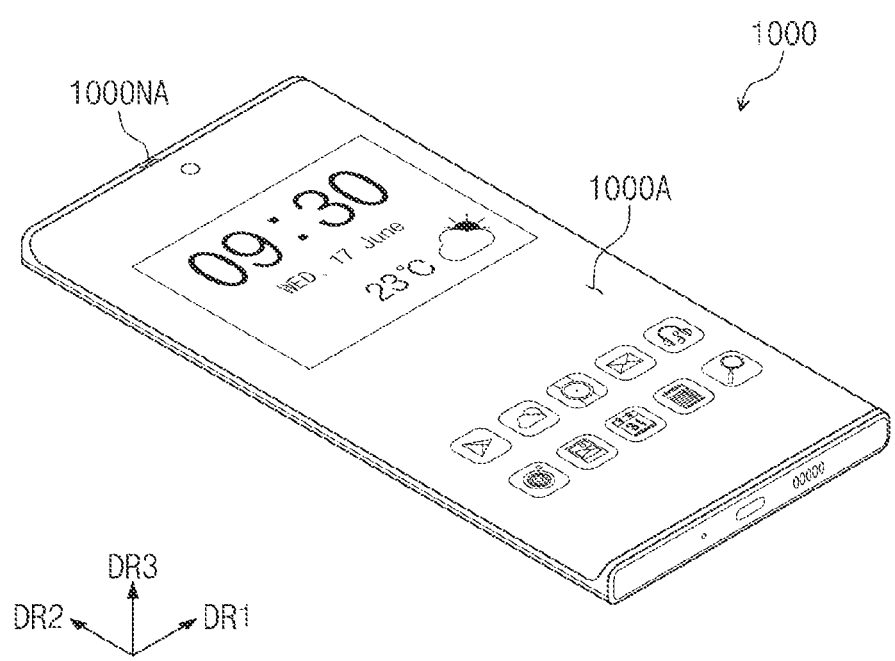
FIG. 1 is a perspective view of an electronic device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

As used herein, the singular forms "a", "an" and "the" are intended to include the plural forms as well, unless the context clearly indicates otherwise.

It will be understood that the terms "include", "comprise", "have", etc. specify the presence of features, numbers, steps, operations, elements, or components, described in the specification, or a combination thereof, not precluding the presence or addition of one or more other features, numbers, steps, operations, elements, or components or a combination thereof.

The term "part" or "unit" refers to a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Therefore, the software components may be, for example, object-oriented software components, class components, and task components, and may include processes, functions, attributes, procedures, subroutines, program code segments, drivers, firmware, micro-codes, circuits, data, database, data structures, tables, arrangements, or variables.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

FIG. 1 is a perspective view of an electronic device according to an embodiment of the present disclosure.

Referring to FIG. 1, an electronic device 1000 may be activated, in response to an electrical signal. For example, the electronic device 1000 may be a mobile phone, a foldable mobile phone, a notebook computer, a television, a tablet computer, a car navigation system, a game console, or a wearable device, but is not limited thereto. FIG. 1 illustrates that the electronic device 1000 is a mobile phone.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may surround the active area 1000A.

The thickness direction of the electronic device 1000 may be parallel to a third direction DR3 crossing the first direction DR1 and the second direction DR2. For example, the thickness direction of the electronic device 1000 may correspond to the third direction DR3. Accordingly, front surfaces (or top surfaces) and rear surfaces (or bottom surfaces) of members constituting the electronic device 1000 may be defined based on the third direction DR3.

Although FIG. 1 illustrates the electronic device 1000 of a bar type (e.g., a mobile device having the shape of a bar), by way of example, embodiments of the present disclosure are not limited thereto. For example, the descriptions to be described below may be applied to various electronic devices such as, for example, a foldable electronic device 1000, a rollable electronic device 1000, or a slidable electronic device 1000.

Figure 2:
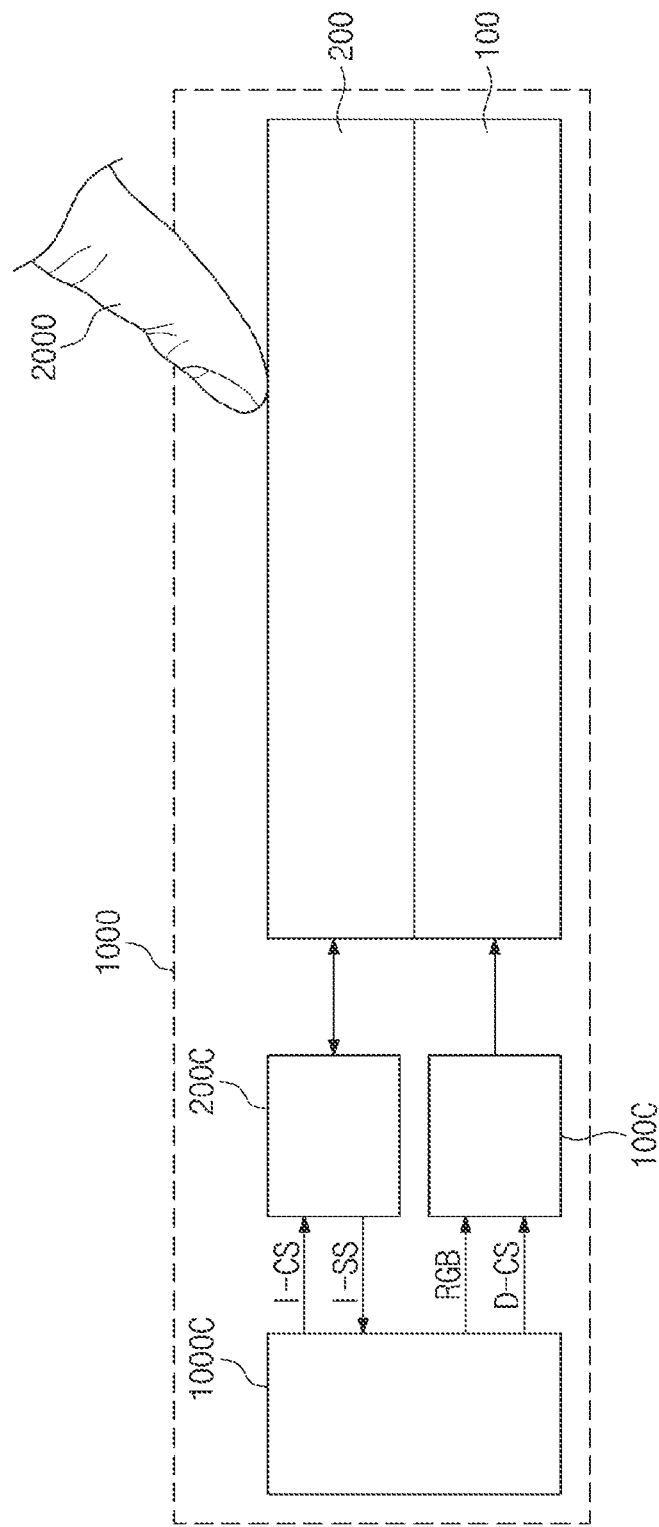
FIG. 2 is a diagram referred to for describing an operation of an electronic device according to an embodiment of the present disclosure.

FIG. 2 is a diagram referred to for describing an operation of an electronic device according to an embodiment of the present disclosure.

Referring to FIG. 2, the electronic device 1000 may include a display layer 100, a sensor layer 200, a display driver 100C, a sensor driver 200C, and a main driver 1000C.

The display layer 100 may be an element configured to generate an image. The display layer 100 may be a light emitting display layer. For example, the display layer 100 may include an organic light emitting display layer, an inorganic light emitting display layer, an organic-inorganic light emitting display layer, a quantum dot display layer, a micro LED display layer, or a nano LED display layer.

The sensor layer 200 may be disposed on the display layer 100. The sensor layer 200 may sense an external input 2000 applied from outside of the electronic device 1000. The external input 2000 may include any input means capable of providing a change in capacitance. For example, the sensor layer 200 may sense not only a passive type input such as a user's body, but may also sense an active type input providing a driving signal.

The main driver 1000C may control the overall operation of the electronic device 1000. For example, the main driver 1000C may control operations of the display driver 100C and the sensor driver 200C. The main driver 1000C may include at least one microprocessor. The main driver 1000C may be referred to as a host. The main driver 1000C may further include a graphic controller.

The display driver 100C may drive the display layer 100. The display driver 100C may receive image data RGB and a control signal D-CS from the main driver 1000C. The control signal D-CS may include various signals. For example, the control signal D-CS may include an input vertical synchronization signal, an input horizontal synchronization signal, a main clock, and a data enable signal. The display driver 100C may generate the vertical synchronization signal and the horizontal synchronization signal that control the timing of providing a signal to the display layer 100, based on the control signal D-CS.

The sensor driver 200C may drive the sensor layer 200. The sensor driver 200C may receive a control signal I-CS from the main driver 1000C. The control signal I-CS may include a mode determination signal for determining a driving mode of the sensor driver 200C or a clock signal.

The sensor driver 200C may calculate coordinate information of an input based on a signal received from the sensor layer 200 and may provide a coordinate signal I-SS including the coordinate information to the main driver 1000C. The main driver 1000C executes an operation corresponding to a user input, based on the coordinate signal I-SS. For example, the main driver 1000C may operate the display driver 100C to display a new application image on the display layer 100 based on the coordinate signal I-SS.

Figure 3A:
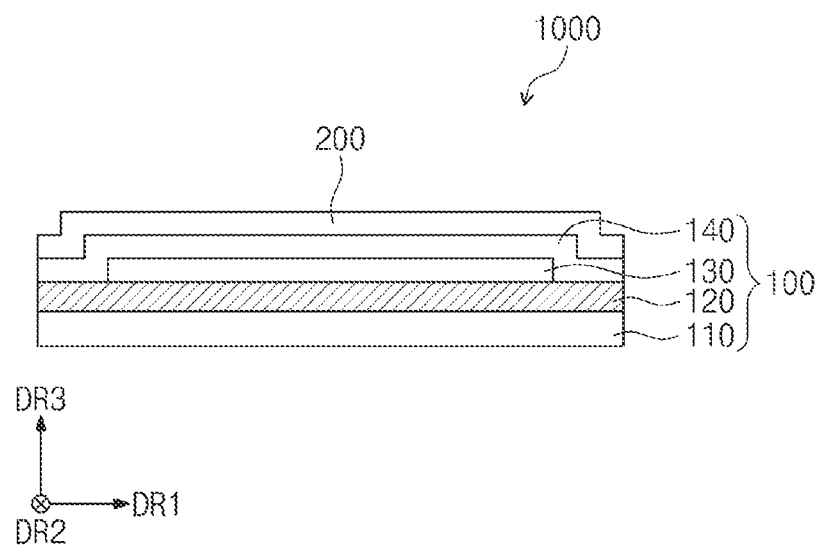
FIG. 3A is a cross-sectional view of an electronic device according to an embodiment of the present disclosure.

FIG. 3A is a cross-sectional view of an electronic device according to an embodiment of the present disclosure.

Referring to FIG. 3A, the display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be, for example, a glass substrate, a metal substrate, a polymer substrate, etc. However, embodiments of the present disclosure are not limited thereto. For example, according to embodiments, the base layer 110 may be an inorganic layer, an organic layer, or a composite material layer.

The circuit layer 120 may be disposed on the base layer 110. The circuit layer 120 may include, for example, an insulating layer, a semiconductor pattern, a conductive pattern, a signal line, etc. An insulating layer, a semiconductor layer, and a conductive layer may be formed on the base layer 110 by a coating or deposition process, and the insulating layer, the semiconductor layer, and the conductive layer may then be selectively patterned through a plurality of photolithography processes. Thereafter, a semiconductor pattern, a conductive pattern, and a signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as, for example, moisture, oxygen, and dust particles.

The sensor layer 200 may be disposed on the display layer 100. The sensor layer 200 may sense an external input applied to the sensor layer 200 from outside of the electronic device 1000. The external input may be a user input. The user input may include various types of external inputs such as, for example, a part of a user body, light, heat, a pen, or pressure.

The sensor layer 200 may be formed on the display layer 100 through a successive process. In this case, the sensor layer 200 may be expressed as being directly disposed on the display layer 100. The wording "~being directly disposed~" indicates that a third component is not intervened between the sensor layer 200 and the display layer 100. For example, in an embodiment, an additional component such as an adhesive member is not interposed between the sensor layer 200 and the display layer 100 when the sensor layer 200 is directly disposed on the display layer 100, and the sensor layer 200 directly contacts the display layer 100. Alternatively, the sensor layer 200 may be bonded to the display layer 100 through an adhesive member. The adhesive member may include a typical adhesive or a sticking agent.

According to an embodiment, the electronic device 1000 may further include an anti-reflection layer and an optical layer disposed on the sensor layer 200. The anti-reflection layer may reduce reflectance of external light incident from outside of the electronic device 1000. The optical layer may increase the front luminance of the electronic device 1000 by controlling a direction of the light incident from the display layer 100.

Figure 3B:
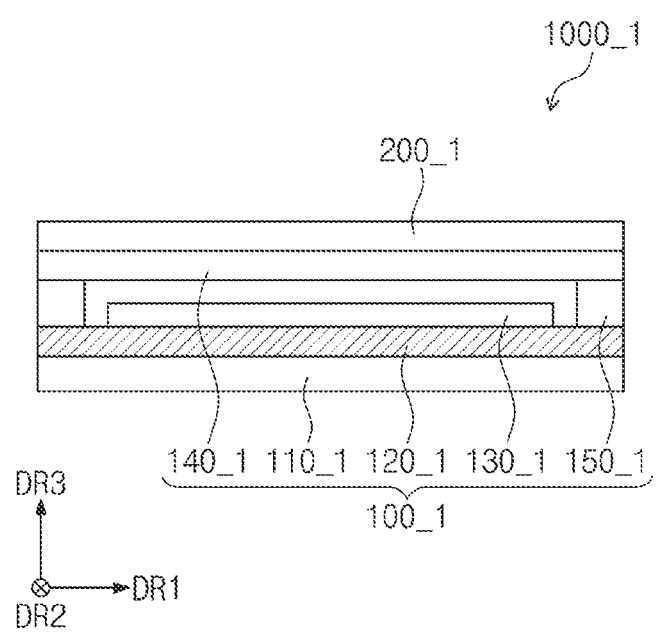
FIG. 3B is a cross-sectional view of an electronic device according to an embodiment of the present disclosure.

FIG. 3B is a cross-sectional view of an electronic device according to an embodiment of the present disclosure.

Referring to FIG. 3B, an electronic device 1000_1 may include a display layer 100_1 and a sensor layer 200_1. The display layer 100_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may be, for example, a glass substrate, a metal substrate, or a polymer substrate, but is not particularly limited thereto.

The coupling member 150_1 may be disposed between the base substrate 110_1 and the encapsulation substrate 140_1. The coupling member 150_1 may couple the encapsulation substrate 140_1 to the base substrate 110_1 or the circuit layer 120_1. The coupling member 150_1 may include an inorganic material or an organic material. For example, the inorganic material may include a frit seal, and the organic material may include a photo-curable resin or a photo-plastic resin. However, the material constituting the coupling member 150_1 is not limited to the above examples.

The sensor layer 200_1 may be directly disposed on the encapsulation substrate 140_1. The wording "~being directly disposed~" indicates that a third component is not intervened between the sensor layer 200_1 and the encapsulation substrate 140_1. That is, in an embodiment, an additional member such as a separate adhesive member is not disposed between the sensor layer 200_1 and the display layer 100_1, and the sensor layer 200_1 directly contacts the display layer 100_1, when the sensor layer 200_1 is directly disposed on the encapsulation substrate 140_1. However, embodiments of the present disclosure are not limited thereto. For example, according to embodiments, an adhesive layer may be further disposed between the sensor layer 200_1 and the encapsulation substrate 140_1.

Figure 4:
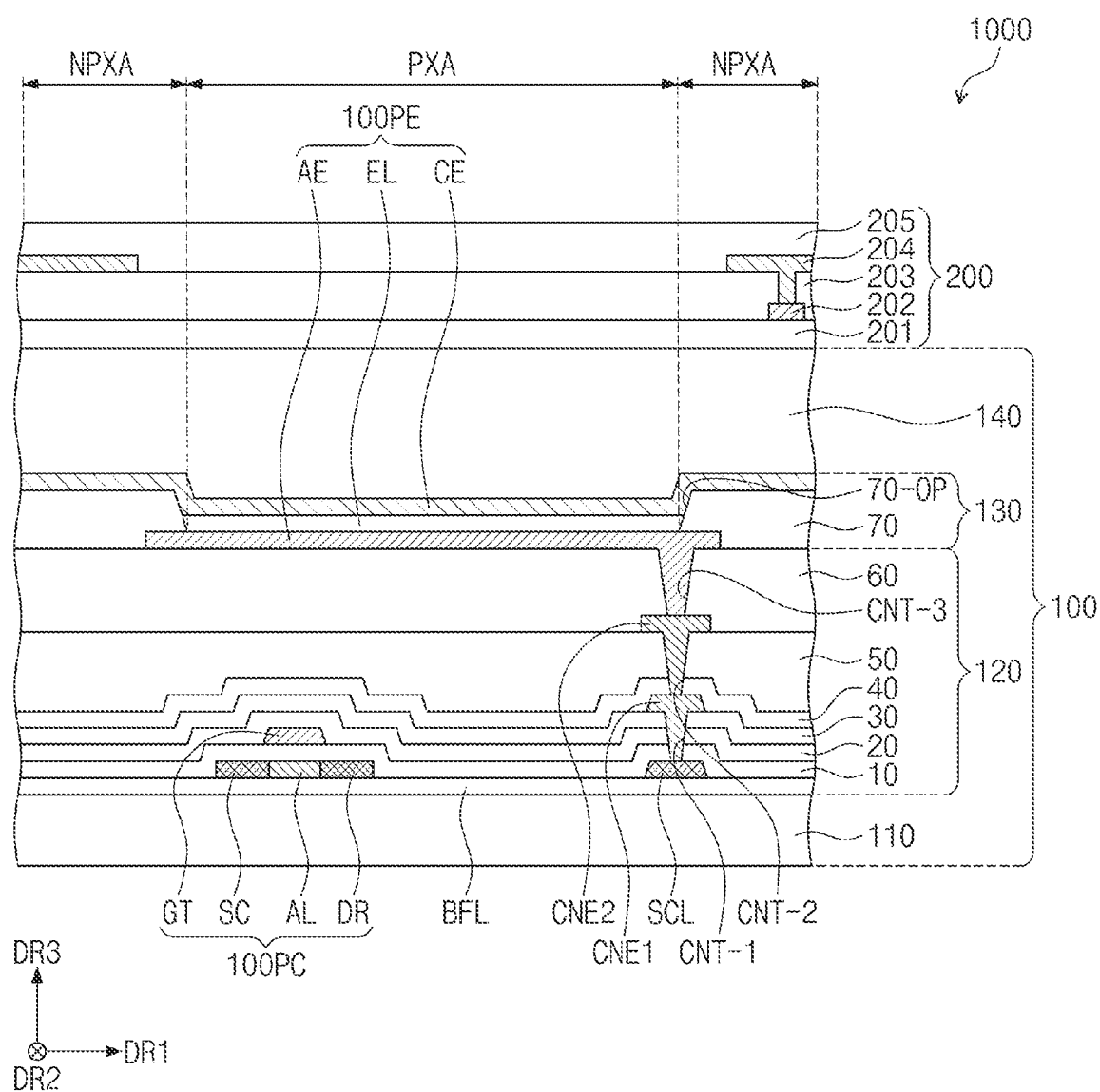
FIG. 4 is a cross-sectional view of an electronic device according to an embodiment of the present disclosure.

FIG. 4 is a cross-sectional view of an electronic device according to an embodiment of the present disclosure.

Referring to FIG. 4, at least one inorganic layer is formed on the upper surface of the base layer 110. The inorganic layer may include at least one of, for example, aluminum oxide, titanium oxide, silicon oxide, silicon nitride, silicon oxy nitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may increase a bonding force between the base layer 110 and a semiconductor pattern. The buffer layer BFL may include at least one of, for example, silicon oxide, silicon nitride, and silicon oxy nitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, embodiments of the present disclosure are not limited thereto. For example, according to embodiments, the semiconductor pattern may include amorphous silicon, low-temperature polycrystalline silicon, or an oxide semiconductor.

For convenience of illustration, FIG. 4 only illustrates a portion of the semiconductor pattern. However, it is to be understood that the semiconductor pattern may be further disposed in another area(s). Semiconductor patterns may be arranged across pixels in a specific rule. The semiconductor pattern may have a different electrical property depending on whether the semiconductor pattern is doped. The semiconductor pattern may include a first area and a second area. The first area may have higher conductivity than the second area. The first area may be doped with an N-type dopant or a P-type dopant. A P-type transistor may include a doped area doped with a P-type dopant, and an N-type transistor may include a doped area doped with an N-type dopant. The second area may be a non-doped area or an area doped at a lower concentration than the first area.

The conductivity of the first area may be greater than the conductivity of the second area, and the first area may substantially serve as an electrode or a signal line. The second area may substantially correspond to an active (or channel) of a transistor. For example, a portion of the semiconductor pattern may be an active of a transistor, another portion thereof may be a source or a drain of the transistor, and another portion thereof may be a connection electrode or a connection signal line.

Each of the pixels may have an equivalent circuit including seven transistors, one capacitor, and a light emitting element, and the equivalent circuit diagram of the pixel may be modified in various forms. One transistor 100PC and one light emitting element 100PE included in the pixel are illustrated in FIG. 4 by way of example.

A source area SC, an active area AL, and a drain area DR of the transistor 100PC may be formed from the semiconductor pattern. The source area SC and the drain area DR may extend in opposite directions from the active area AL on a cross-section. A portion of a connection signal line SCL forming from the semiconductor pattern is illustrated in FIG. 4. According to embodiments, the connection signal line SCL may be connected to the drain area DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer structure or a multi-layer structure. The first insulating layer 10 may include at least one of, for example, aluminum oxide, titanium oxide, silicon oxide, silicon nitride, silicon oxy nitride, zirconium oxide, and hafnium oxide. In an embodiment, the first insulating layer 10 may be a single-layer silicon oxide layer. The insulating layer of the circuit layer 120, which is described further below, as well as the first insulating layer 10, may be an inorganic layer and/or an organic layer, and may have a single-layer structure or a multi-layer structure. The inorganic layer may include at least one of the above-described materials, but is not limited thereto.

A gate GT of the transistor 100PC is disposed on the first insulating layer 10. The gate GT may be a part of a metal pattern. The gate GT overlaps the active area AL. In the process of doping the semiconductor pattern, the gate GT may function as a mask.

A second insulating layer 20 may be disposed on the first insulating layer 10 and may cover the gate GT. The second insulating layer 20 may overlap the pixels in common. The second insulating layer 20 may be an inorganic layer and/or an organic layer, and may have a single-layer structure or a multi-layer structure. The second insulating layer 20 may include at least one of, for example, silicon oxide, silicon nitride, and silicon oxy nitride. In an embodiment, the second insulating layer 20 may have a multilayer structure including a silicon oxide layer and a silicon nitride layer.

A third insulating layer 30 may be disposed on the second insulating layer 20. The third insulating layer 30 may have a single-layer structure or a multi-layer structure. In an embodiment, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, the description will be given under the condition that the light emitting element 100PE is an organic light emitting element. However, embodiments of the present disclosure are not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active area 1000A (refer to FIG. 1) may include an emission area PXA and a non-emission area NPXA disposed adjacent to the emission area PXA. The non-emission area NPXA may surround the emission area PXA. In an embodiment, the emission area PXA is defined to correspond to the portion of the first electrode AE, which is exposed by the opening 70-OP.

The light emitting layer EL may be disposed on the first electrode AE. The light emitting layer EL may be disposed in an area defined by the opening 70-OP. For example, the light emitting layer EL may be separately formed for respective pixels. In the case where light emitting layers EL are separately formed for respective pixels, each of the light emitting layers EL may emit a light of at least one of a blue color, a red color, and a green color. However, embodiments of the present disclosure are not limited thereto. For example, according to embodiments, the light emitting layer EL may be connected to the pixels in common. In this case, the light emitting layer EL may provide blue light or white light.

The second electrode CE may be disposed on the light emitting layer EL. The second electrode CE may be integrally disposed in a plurality of pixels in common.

According to embodiments, a hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electronic control layer may be disposed between the light emitting layer EL and the second electrode CE. The electron control layer may include an electron transport layer and may further include an electron injection layer. The hole control layer and the electron control layer may be formed, in common, in a plurality of pixels by using an open mask.

The encapsulation layer 140 may be disposed on the light emitting element layer 130. The encapsulation layer 140 may include, for example, an inorganic layer, an organic layer, and an inorganic layer sequentially stacked. However, layers constituting the encapsulation layer 140 are not limited thereto. The inorganic layers may protect the light emitting element layer 130 from, for example, moisture and oxygen, and the organic layer may protect the light emitting element layer 130 from a foreign material such as, for example, dust particles. The inorganic layers may include, for example, a silicon nitride layer, a silicon oxy nitride layer, a silicon oxide layer, a titanium oxide layer, or an aluminum oxide layer. The organic layer may include, but is not limited to, an acrylic-based organic layer.

The sensor layer 200 may include a base layer 201, a first conductive layer 202, a sensing insulating layer 203, a second conductive layer 204, and a cover insulating layer 205.

The base layer 201 may be an inorganic layer including at least one of, for example, silicon nitride, silicon oxy nitride, and silicon oxide. Alternatively, the base layer 201 may be an organic layer including, for example, an epoxy resin, an acrylate resin, or an imide-based resin. The base layer 201 may have a single-layer structure or may have a multi-layer structure stacked in the third direction DR3.

Each of the first conductive layer 202 and the second conductive layer 204 may have a single-layer structure or may have a multi-layer structure stacked in the third direction DR3.

A conductive layer of a single-layer structure may include a metal layer or a transparent conductive layer. The metal layer may include, for example, molybdenum, silver, titanium, copper, aluminum, or the alloy thereof. The transparent conductive layer may include transparent conductive oxide, such as, for example, indium tin oxide (ITO), indium zinc oxide (IZO), zinc oxide (ZnO), or indium zinc tin oxide (IZTO), etc. In addition, the transparent conductive layer may include a conductive polymer such as, for example, PEDOT, metal nanowires, graphene, etc.

The multi-layered conductive layer may include metal layers. The metal layers may, for example, have a three-layer structure of titanium/aluminum/titanium. The multi-layered conductive layer may include at least one metal layer and at least one transparent conductive layer.

At least one of the sensing insulating layer 203 and the cover insulating layer 205 may include an inorganic film. The inorganic film may include at least one of, for example, aluminum oxide, titanium oxide, silicon oxide, silicon nitride, silicon oxy nitride, zirconium oxide, and hafnium oxide.

At least one of the sensing insulating layer 203 and the cover insulating layer 205 may include an organic film. The organic film may be made of at least one of, for example, acrylic resin, methacrylic resin, polyisoprene, vinyl-based resin, epoxy-based resin, urethane-based resin, cellulose-based resin, siloxane-based resin, polyimide-based resin, polyamide-based resin, and perylene-based resin.

Figure 5:
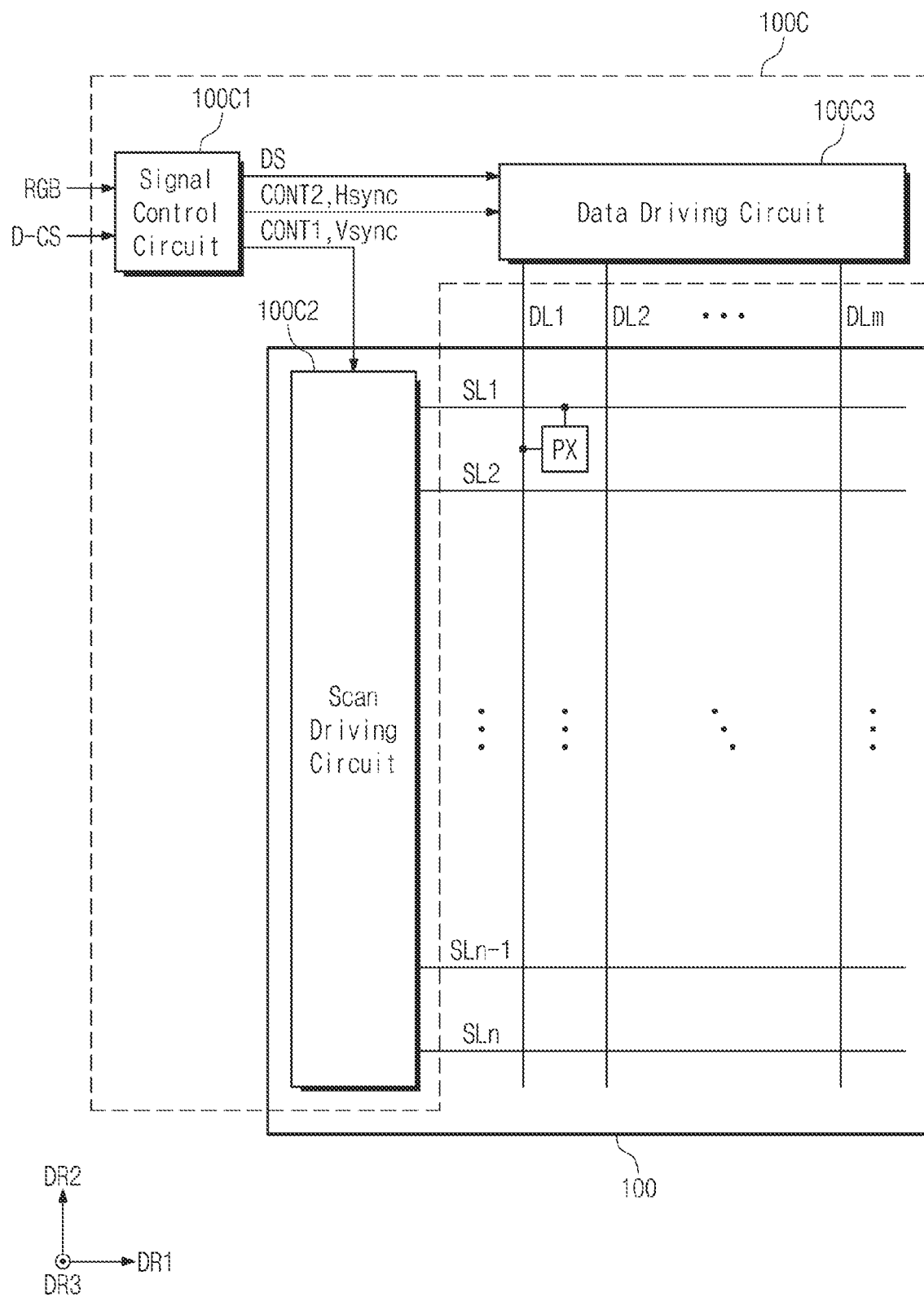
FIG. 5 is a block diagram of a display layer and a display driver according to an embodiment of the present disclosure.

FIG. 5 is a block diagram of a display layer and a display driver according to an embodiment of the present disclosure.

Referring to FIG. 5, the display layer 100 may include a plurality of scan lines SL1 to SLn, a plurality of data lines DL1 to DLm, and a plurality of pixels PX, in which each of n and m is a positive integer. Each of the plurality of pixels PX is connected to a corresponding data line of the plurality of data lines DL1 to DLm and may be connected to a corresponding scan line of the plurality of scan lines SL1 to SLn. In an embodiment of the present disclosure, the display layer 100 may further include light emission control lines, and the display driver 100C may further include a light emission driving circuit that provides control signals to the light emission control lines. However, the configuration of the display layer 100 is not particularly limited.

Each of the plurality of scan lines SL1 to SLn may extend in the first direction DR1, and the plurality of scan lines SL1 to SLn may be spaced from each other in the second direction DR2. Each of the plurality of data lines DL1 to DLm may extend in the second direction DR2, and the plurality of data lines DL1 to DLm may be spaced from each other in the first direction DR1.

The display driver 100C may include a signal control circuit 100C1, a scan driving circuit 100C2, and a data driving circuit 100C3.

The signal control circuit 100C1 may receive the image data RGB and the control signal D-CS from the main driver 1000C (refer to FIG. 2). The control signal D-CS may include various signals. For example, the control signal D-CS may include an input vertical synchronization signal, an input horizontal synchronization signal, a main clock, and a data enable signal.

The signal control circuit 100C1 may generate a first control signal CONT1 and a vertical synchronization signal Vsync based on the control signal D-CS, and may output the first control signal CONT1 and the vertical synchronization signal Vsync to the scan driving circuit 100C2.

The signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C3.

In addition, the signal control circuit 100C1 may output a driving signal DS obtained by processing the image data RGB to match to the operating condition of the display layer 100 to the data driving circuit 100C3. The first control signal CONT1 and the second control signal CONT2 are signals utilized for the operation of the scan driving circuit 100C2 and the data driving circuit 100C3, and are not particularly limited thereto.

The scan driving circuit 100C2 drives the plurality of scan lines SL1 to SLn in response to the first control signal CONT1 and the vertical synchronization signal Vsync. In an embodiment of the present disclosure, the scan driving circuit 100C2 may be formed in the same process as the circuit layer 120 (refer to FIG. 4) in the display layer 100. However, embodiments of the present disclosure are not limited thereto. For example, the scan driving circuit 100C2 may be implemented as an integrated circuit (IC) and may be directly mounted on a predetermined area of the display layer 100 or on a separate printed circuit board (PCB) in a chip-on-film (COF) manner to be electrically connected to the display layer 100.

The data driving circuit 100C3 may output a grayscale voltage to the plurality of data lines DL1 to DLm in response to the second control signal CONT2, the horizontal synchronization signal Hsync, and the driving signal DS from the signal control circuit 100C1. The data driving circuit 100C3 may be implemented as an integrated circuit and may be directly mounted on a predetermined area of the display layer 100 or on a separate printed circuit board in a chip-on-film manner to be electrically connected to the display layer 100, but is not particularly limited thereto. For example, the data driving circuit 100C3 may be formed in the same process as the circuit layer 120 (refer to FIG. 4) in the display layer 100.

Figure 6:
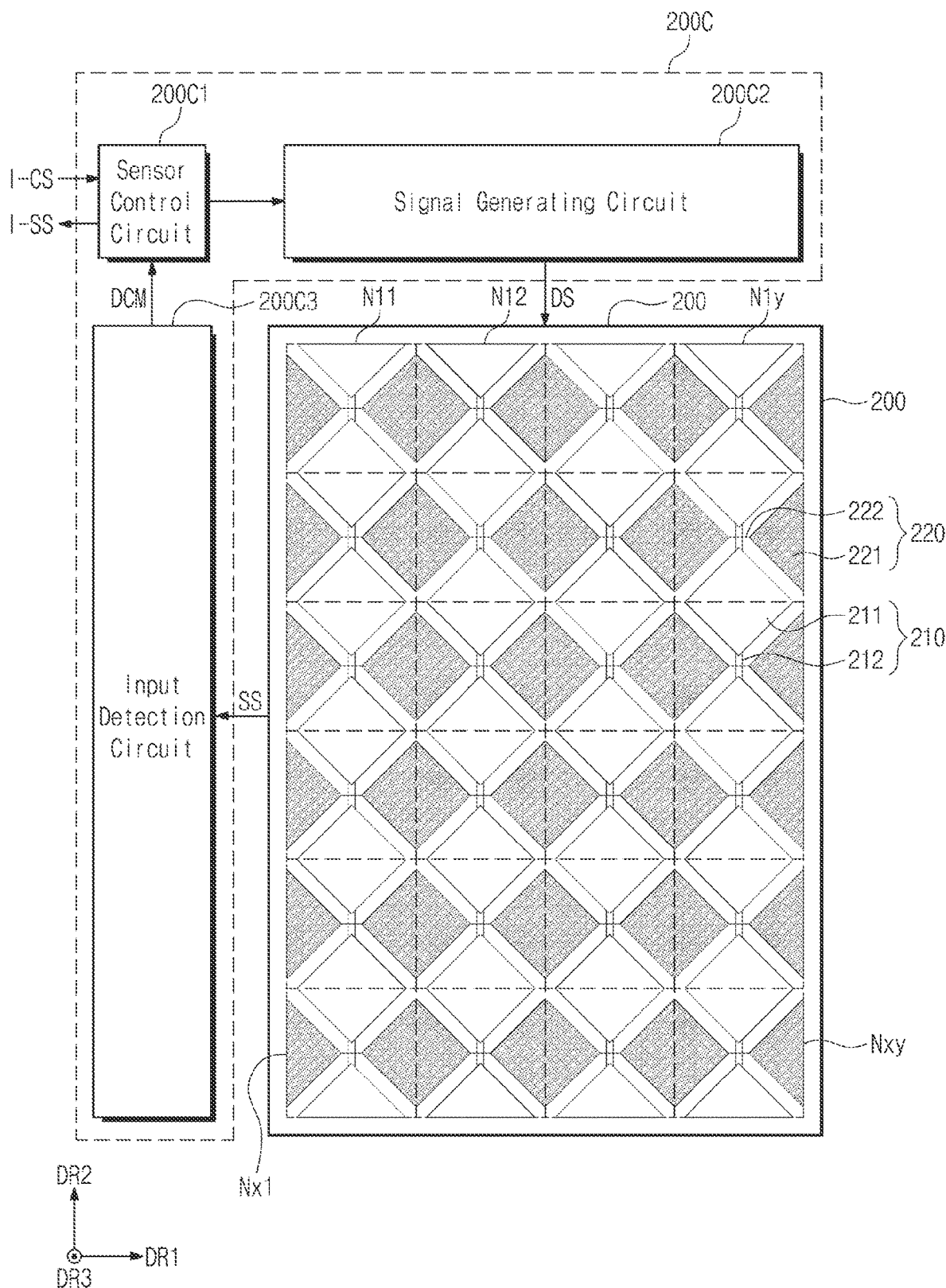
FIG. 6 is a block diagram of a sensor layer and a sensor driver according to an embodiment of the present disclosure.

FIG. 6 is a block diagram of a sensor layer and a sensor driver according to an embodiment of the present disclosure.

Referring to FIG. 6, the sensor layer 200 may include a plurality of electrodes 210 and a plurality of cross electrodes 220. The plurality of electrodes 210 may be arranged in the first direction DR1, and each of the plurality of electrodes 210 may extend in the second direction DR2. The plurality of cross electrodes 220 may be arranged in the second direction DR2, and each of the plurality of cross electrodes 220 may extend in the first direction DR1. The plurality of electrodes 210 may cross the plurality of cross electrodes 220. The sensor layer 200 may further include a plurality of signal lines connected to the plurality of electrodes 210 and the plurality of cross electrodes 220.

Each of the plurality of electrodes 210 may include a sensing pattern 211 and a bridge pattern 212. The two sensing patterns 211 disposed adjacent to each other may be electrically connected to each other by the two bridge patterns 212, but is not particularly limited thereto. The sensing pattern 211 may be included in the second conductive layer 204 (refer to FIG. 4), and the bridge pattern 212 may be included in the first conductive layer 202 (refer to FIG. 4).

Each of the plurality of cross electrodes 220 may include a first portion 221 and a second portion 222. The first portion 221 and the second portion 222 may have an integral shape together with each other and may be disposed on the same layer. For example, the first portion 221 and the second portion 222 may be included in the second conductive layer 204 (refer to FIG. 4). The two bridge patterns 212 may insulate and cross the second portion 222.

The sensor driver 200C may receive the control signal I-CS from the main driver 1000C (refer to FIG. 2), and may provide the coordinate signal I-SS to the main driver 1000C (refer to FIG. 2).

The sensor driver 200C may be implemented as an integrated circuit (IC) and may be directly mounted on a predetermined area of the sensor layer 200 or on a separate printed circuit board in a chip-on-film (COF) manner to be electrically connected to the sensor layer 200.

The sensor driver 200C may include a sensor control circuit 200C1, a signal generating circuit 200C2, and an input detection circuit 200C3. The sensor control circuit 200C1 may control operations of the signal generating circuit 200C2 and the input detection circuit 200C3 based on the control signal I-CS.

The signal generating circuit 200C2 may sequentially output the driving signal DS to the sensor layer 200, for example, the cross electrodes 220. The input detection circuit 200C3 may receive sensing signals SS from the sensor layer 200. For example, the input detection circuit 200C3 may receive the sensing signals SS from the electrodes 210. In an embodiment of the present disclosure, the signal generating circuit 200C2 may sequentially output the driving signal DS to the electrodes 210, and the input detection circuit 200C3 may receive the sensing signals SS from the cross electrodes 220.

The input detection circuit 200C3 may convert the sensing signals SS into sensitivity values DCM, respectively. For example, the sensing signals SS may be analog capacitance signals due to a touch. The input detection circuit 200C3 may include an analog-to-digital converter that converts the analog capacitance signal into the sensitivity values DCM of a digital type.

The sensing signals SS and respective sensitivity values DCM corresponding thereto may correspond to each of the nodes N11 to Nxy. For example, one sensitivity value may be derived by one sensing signal corresponding to one node where, x is a positive integer and y is a positive integer.

Each of the nodes N11 to Nxy may be defined in an area where one electrode 210 of the plurality of electrodes 210 intersects one cross electrode 220 of the plurality of cross electrodes 220. FIG. 6 illustrates that four nodes N11, N12 to N1y are arranged in the first direction DR1, and six nodes N11 to Nx1 are arranged in the second direction DR2, by way of example. However, the number of nodes N11 to Nxy is not limited thereto, and the number of nodes N11 to Nxy may be greater or less than that illustrated in FIG. 6 according to embodiments of the present disclosure.

Figure 7:
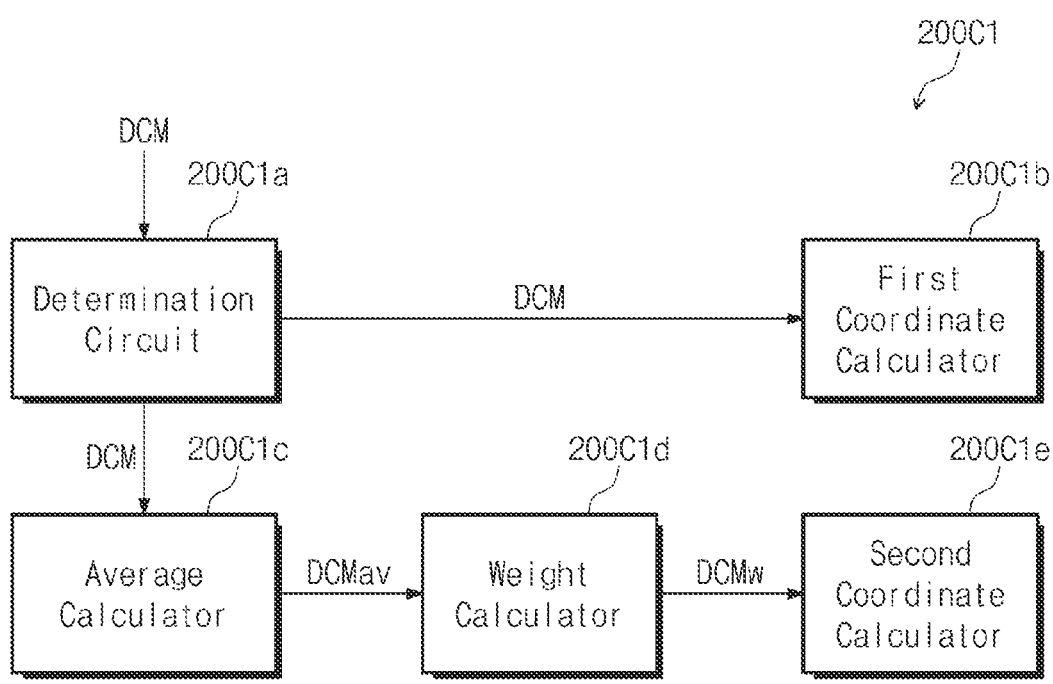
FIG. 7 is a block diagram of a sensor driver according to an embodiment of the present disclosure.
Figure 8:
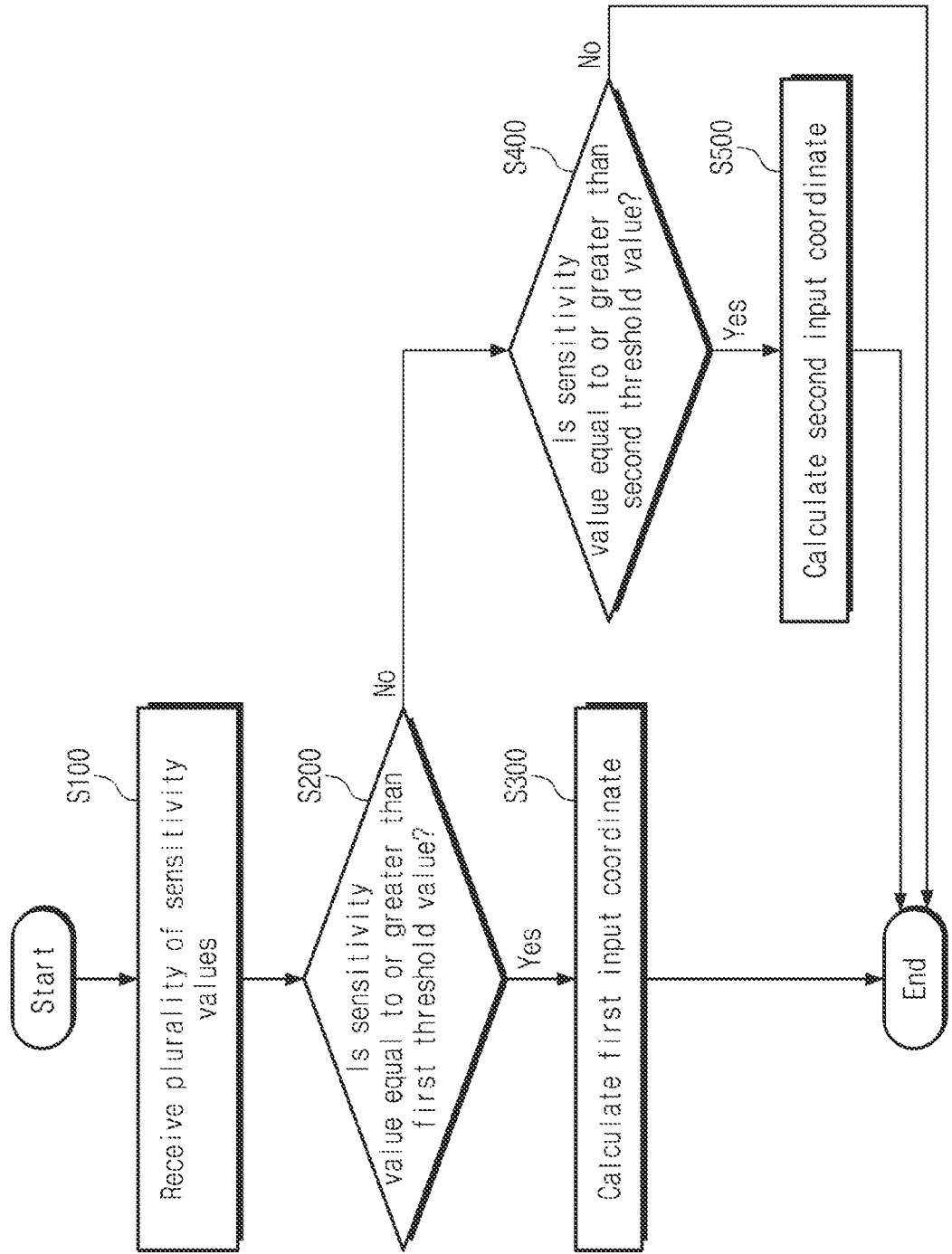
FIG. 8 is a flowchart describing an operation of a sensor driver according to an embodiment of the present disclosure.

FIG. 7 is a block diagram of a sensor driver according to an embodiment of the present disclosure. FIG. 8 is a flowchart describing an operation of a sensor driver according to an embodiment of the present disclosure.

Referring to FIGS. 6, 7, and 8, the sensor control circuit 200C1 may include a determination circuit 200C1a, a first coordinate calculator 200C1b, an average calculator 200C1c, a weight calculator 200C1d, and a second coordinate calculator 200C1e. Although the first coordinate calculator 200C1b and the second coordinate calculator 200C1e are separately illustrated in FIG. 7, the first and second coordinate calculators 200C1b and 200C1e may be combined into one coordinate calculator. The first coordinate calculator 200C1b, the average calculator 200C1c, the weight calculator 200C1d, and the second coordinate calculator 200C1e may be referred to as a first coordinate circuit 200C1b, an average circuit 200C1c, a weight circuit 200C1d, and a second coordinate circuit 200C1e, respectively.

The determination circuit 200C1a receives the plurality of sensitivity values DCM (S100). The determination circuit 200C1a determines whether each of the sensitivity values DCM is equal to or greater than a first threshold value (S200). When the sensitivity value DCM is equal to or greater than the first threshold value, the first coordinate calculator 200C1b calculates a first input coordinate based on the sensitivity value DCM (S300).

When the sensitivity value DCM is less than the first threshold value, the determination circuit 200C1a determines whether the sensitivity value DCM is equal to or greater than a second threshold value (S400). The second threshold value may be less than the first threshold value. The determination circuit 200C1a may determine whether each of a plurality of sensitivity values received from one node and a plurality of peripheral nodes disposed adjacent to the one node is less than the first threshold value and greater than or equal to the second threshold value. When the sensitivity values DCM of the four adjacent nodes are equal to or greater than the second threshold value, the determination circuit 200C1a provides the sensitivity values DCM to the average calculator 200C1c.

The first threshold value may be greater than the second threshold value. For example, the second threshold value may be equal to or greater than about ⅔ of the first threshold value. When the first threshold value is 300, the second threshold value may be 200. However, this is only an example and is not particularly limited thereto. When the second threshold value is about ⅔ or more of the first threshold value, an error in recognizing a touch may be reduced or eliminated even when a touch does not occur. That is, as the second threshold value is set to about ⅔ or more of the first threshold value, a touch unrecognized error with respect to a valid touch may be reduced, and an error of recognizing an erroneous touch may also be reduced.

The average calculator 200C1c may calculate an average sensitivity value DCMav for the plurality of sensitivity values DCM for calculating input coordinates. The weight calculator 200C1d may calculate weights DCMw for each of the plurality of sensitivity values DCM based on the average sensitivity value DCMav. The second coordinate calculator 200C1e may calculate a second input coordinate based on the weights DCMw (S500).

According to an embodiment of the present disclosure, input coordinates may be calculated by calculating the average sensitivity value DCMav and weights DCMw even for a valid touch whose sensitivity is insufficient. Accordingly, since a touch unrecognized error with respect to a valid touch is reduced, a touch sensitivity or a touch accuracy of the sensor layer may be increased.

Figure 9A:
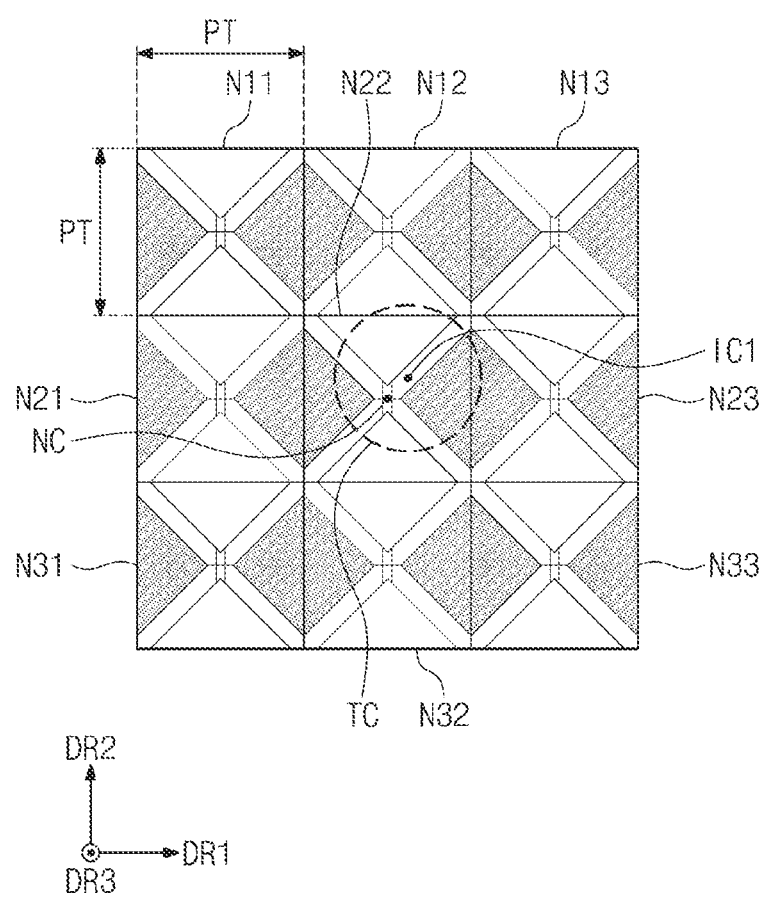
FIG. 9A is a diagram illustrating a portion of a sensor layer according to an embodiment of the present disclosure.
Figure 9B:
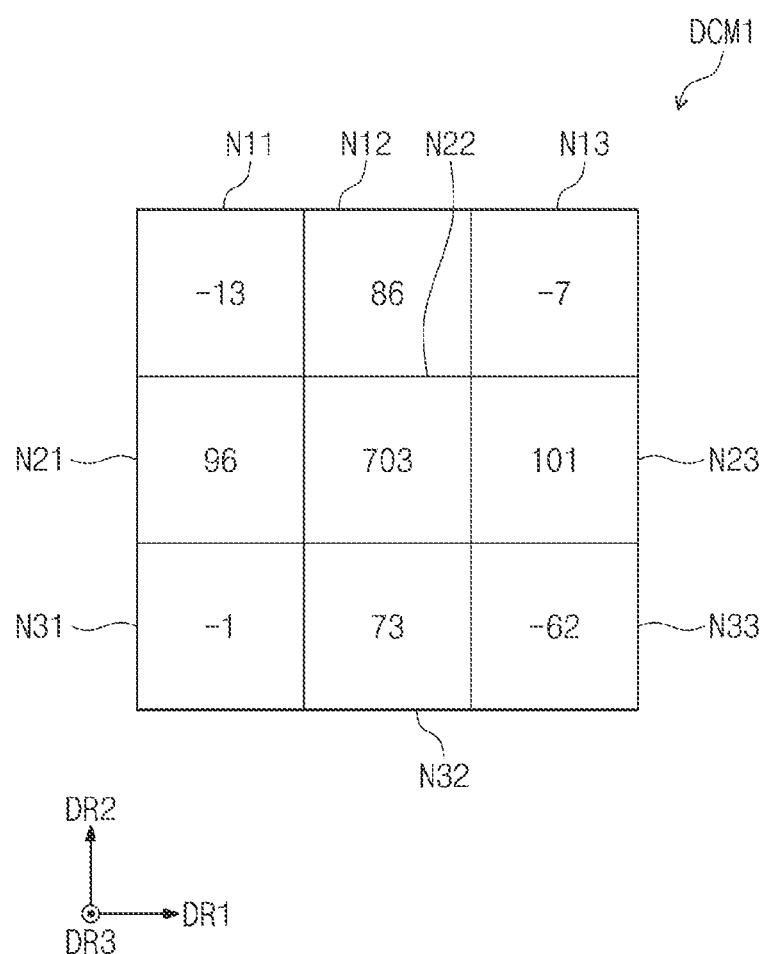
FIG. 9B is a diagram illustrating a part of sensitivity values received according to a first input according to an embodiment of the present disclosure.

FIG. 9A is a diagram illustrating a portion of a sensor layer according to an embodiment of the present disclosure. FIG. 9B is a diagram illustrating a part of sensitivity values received according to a first input according to an embodiment of the present disclosure.

Referring to FIGS. 6, 9A, and 9B, nine nodes N11, N12, N13, N21, N22, N23, N31, N32, and N33 of the sensor layer 200 are illustrated by way of example. A first touch event TC may be generated in a 2-2nd node N22. The first touch event TC may be generated in an area including a center NC of the 2-2nd node N22.

FIG. 9B illustrates sensitivity values DCM1 according to an occurrence of the first touch event TC. The sensitivity value of the 2-2nd node N22 may be 703, and the sensitivity values of the other nodes N11, N12, N13, N21, N23, N31, N32, and N33 may be less than 300.

The first threshold value, which is a reference for calculating the input coordinates in the determination circuit 200C1a (refer to FIG. 7), may be 300, and the second threshold value may be 200. That is, the sensitivity value of the 2-2nd node N22 may be equal to or greater than the first threshold value, and the sensitivity values of the other nodes N11, N12, N13, N21, N23, N31, N32, and N33 may be less than the second threshold value.

The determination circuit 200C1a may calculate a first input coordinate IC1 based on a sensitivity value exceeding 300 among the sensitivity values DCM1. Since the sensitivity values of the other nodes N11, N12, N13, N21, N23, N31, N32, and N33 are less than 200, it may not be recognized as a touch of the corresponding node.

Figure 10:
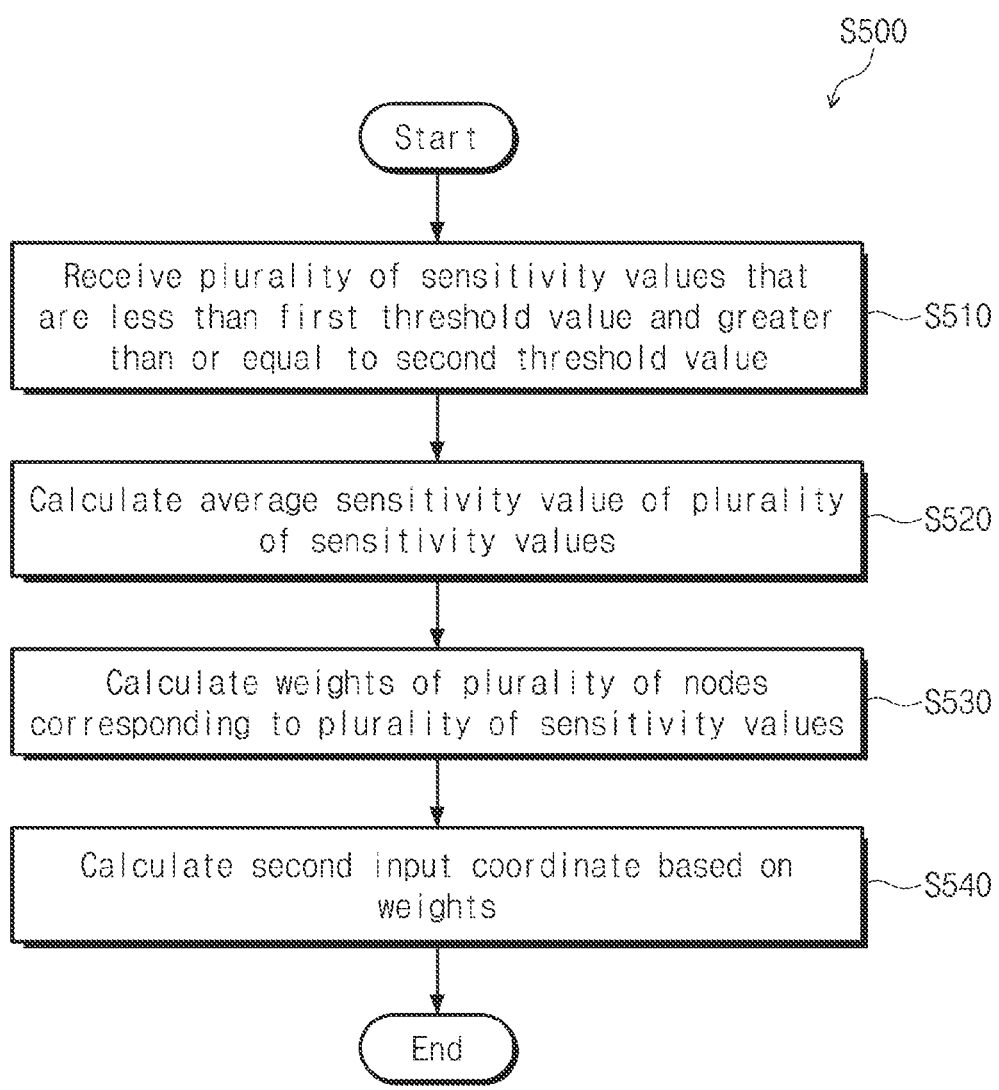
FIG. 10 is a flowchart describing an operation of a sensor driver according to an embodiment of the present disclosure.

FIG. 10 is a flowchart describing an operation of a sensor driver according to an embodiment of the present disclosure. For example, FIG. 10 is a flowchart illustrating an operation of calculating the second input coordinate (S500).

Referring to FIGS. 7 and 10, the average calculator 200C1c receives sensitivity values DCM that are less than the first threshold value and greater than or equal to the second threshold value (S510). The average calculator 200C1c calculates the average sensitivity value DCMav with respect to the sensitivity values DCM (S520). The weight calculator 200C1d calculates weights DCMw for each of the plurality of nodes corresponding to plurality of sensitivity values (S530). The weight calculator 200C1d calculates weights DCMw based on the average sensitivity value DCMay. The second coordinate calculator 200C1e may calculate a second input coordinate based on the weights DCMw (S540).

Figure 11A:
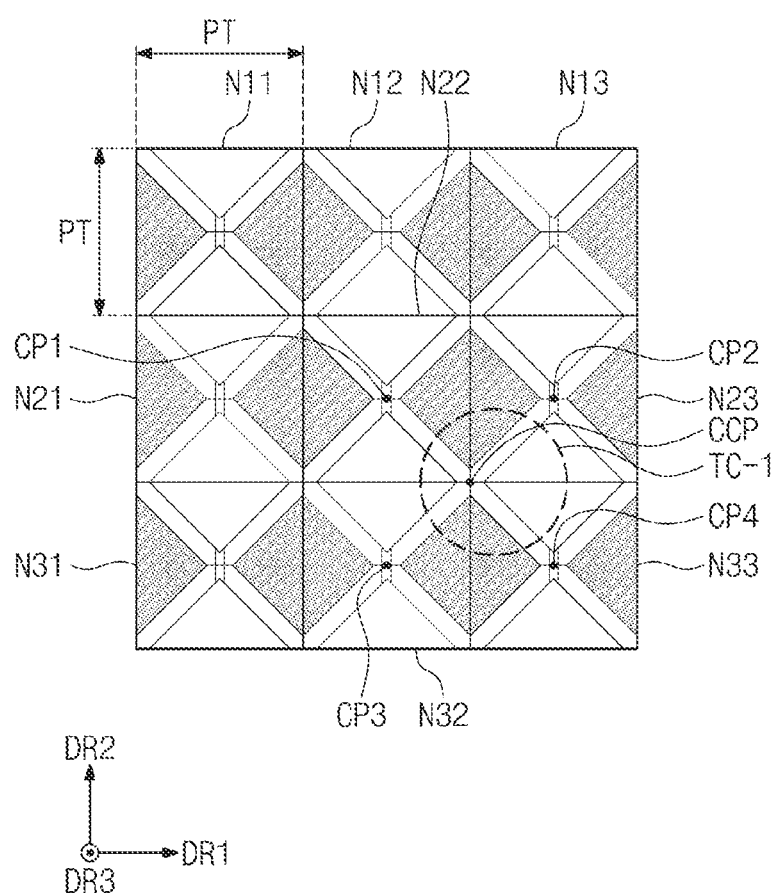
FIG. 11A is a diagram illustrating a portion of a sensor layer according to an embodiment of the present disclosure.

FIG. 11A is a diagram illustrating a portion of a sensor layer according to an embodiment of the present disclosure.

Referring to FIGS. 6, and 11A, nine nodes N11, N12, N13, N21, N22, N23, N31, N32, and N33 of the sensor layer 200 are illustrated by way of example. A second touch event TC-1 may occur adjacent to boundaries between the nodes N22, N23, N32, and N33. For example, the second touch event TC-1 may overlap a point CCP where all of the nodes N22, N23, N32, and N33 meet.

Figure 11B:
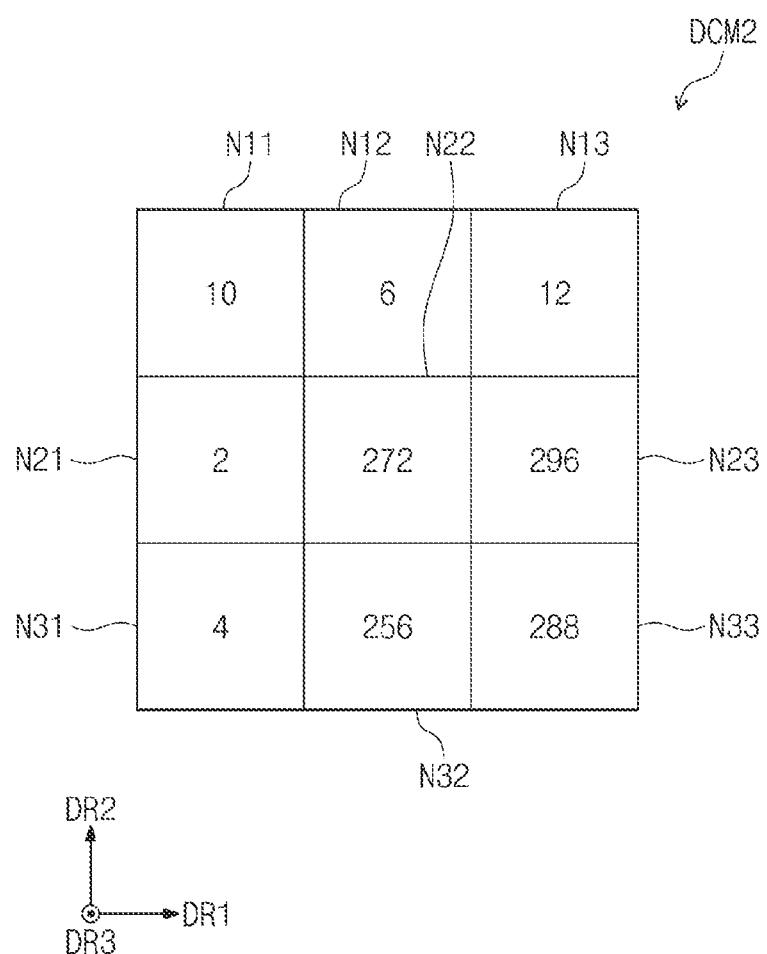
FIG. 11B is a diagram illustrating a part of sensitivity values received according to a second input according to an embodiment of the present disclosure.
Figure 12:
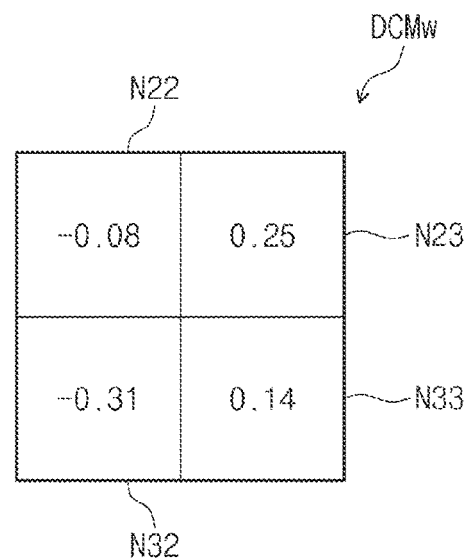
FIG. 12 is a diagram illustrating weights obtained by converting some of sensitivity values according to an embodiment of the present disclosure.

FIG. 11B is a diagram illustrating some of the sensitivity values DCM2 received according to a second input according to an embodiment of the present disclosure. FIG. 12 is a diagram illustrating weights obtained by converting some of sensitivity values according to an embodiment of the present disclosure.

Referring to FIGS. 7, 11A, 11B, and 12, when the second touch event TC-1 occurs, each of the sensitivity values of nodes N22, N23, N32, and N33 may be less than the first threshold value and greater than or equal to the second threshold value. The nodes N22, N23, N32, and N33 having sensitivity values less than the first threshold value and greater than or equal to the second threshold value may be referred to as four adjacent nodes N22, N23, N32, and N33, and the four adjacent nodes N22, N23, N32, and N33 may be referred to as the node N22, the first peripheral node N23, the second peripheral node N32, and the third peripheral node N33, respectively.

The first peripheral node N23 may be disposed adjacent (e.g., directly adjacent) to the node N22 in the first direction DR1, the second peripheral node N32 may be disposed adjacent (e.g., directly adjacent) to the node N22 in the second direction DR2, and the third peripheral node N33 may be disposed adjacent (e.g., directly adjacent) to the first peripheral node N23 in the second direction DR2 and may be disposed adjacent (e.g., directly adjacent) to the second peripheral node N32 in the first direction DR1.

Sensitivity values of the node N22, the first peripheral node N23, the second peripheral node N32, and the third peripheral node N33 may be 272, 296, 256, and 288, respectively. The average calculator 200C1c calculates an average of the sensitivity values of the node N22, the first peripheral node N23, the second peripheral node N32, and the third peripheral node N33. The average sensitivity value DCMav may be 278.

The weight calculator 200C1d may calculate the weights DCMw of the node N22, the first peripheral node N23, the second peripheral node N32, and the third peripheral node N33, based on the average sensitivity value DCMay. Each of the weights DCMw may be calculated by the following equation:

$$\text{Weight} = (\text{sensitivity value} - \text{average sensitivity value}) * (PT/\text{average sensitivity value}).$$

In the above equation, PT may be a pitch PT between the plurality of electrodes 210 or between the plurality of cross electrodes 220. Alternatively, PT may correspond to a width in the first direction DR1 or a width in the second direction DR2 of each of the nodes N11 to Nxy.

The weights DCMw illustrated in FIG. 12 are values obtained by calculating the case where the pitch PT is 4 mm as an example. For example, the weight of the node N22 may be calculated as (272−278)*(4/278), the weight of the first peripheral node N23 may be derived as (296−278)*(4/278), the weight of the second peripheral node N32 may be derived as (256−278)*(4/278), and the weight of the third peripheral node N33 may be derived as (288−278)*(4/278).

Figure 13:
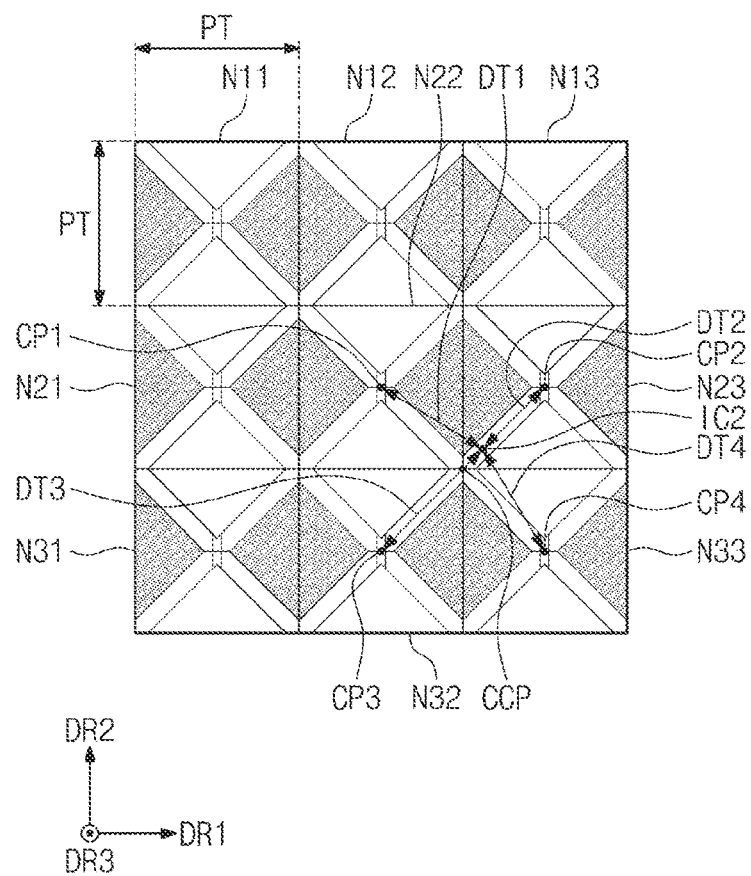
FIG. 13 is a diagram illustrating a sensor layer according to an embodiment of the present disclosure.

FIG. 13 is a diagram illustrating a sensor layer according to an embodiment of the present disclosure. For example, FIG. 13 is a diagram for describing a second input coordinate IC2 derived using the weight calculated in FIG. 12.

Referring to FIGS. 12 and 13, a first center CP1 of the node N22, a second center CP2 of the first peripheral node N23, a third center CP3 of the second peripheral node N32, and a fourth center CP4 of the third peripheral node N33 are illustrated. The weights DCMw may be respectively reflected from the first to fourth centers CP1, CP2, CP3, and CP4 to derive the second input coordinate IC2.

The second input coordinate IC2 may be derived from each of the first to fourth centers CP1, CP2, CP3, and CP4 by reflecting the weight to a reference value. The reference value may correspond to a distance from each of the first to fourth centers CP1, CP2, CP3, and CP4 to the point CCP where all of the nodes N22, N23, N32, and N33 meet.

For example, when the pitches PT in the first direction DR1 and the second direction DR2 are equal to each other, the reference value may be a value obtained by multiplying a square root of 2 by a half of the pitch PT. When the pitch PT is 4 mm, the reference value may be 2.83 obtained by multiplying 2 by the square root of 2. Values obtained by subtracting the weights DCMw from the reference value may be referred to as first to fourth coordinate distance values DT1, DT2, DT3, and DT4. The first coordinate distance value DT1 may be 2.91 mm, the second coordinate distance value DT2 may be 2.58 mm, the third coordinate distance value DT3 may be 3.14 mm, and the fourth coordinate distance value DT4 may be 2.69 mm. The second input coordinate IC2 may be derived from the first to fourth coordinate distance values DT1, DT2, DT3, and DT4.

According to an embodiment of the present disclosure, input coordinates may be calculated by calculating the average sensitivity value DCMav and weights DCMw even for a valid touch generated adjacent to the boundary between the nodes N11 to Nxy or a valid touch with an insufficient sensitivity. Accordingly, since a touch unrecognized error with respect to a valid touch is reduced, touch sensitivity or touch accuracy of the sensor layer 200 may be increased.

According to embodiments of the present disclosure as described above, even for a valid touch whose sensitivity is insufficient, the input coordinates may be calculated by calculating an average sensitivity value of sensitivity values received from a plurality of adjacent nodes and weights of the plurality of adjacent nodes. Accordingly, since a touch unrecognized error with respect to a valid touch is reduced, touch sensitivity or touch accuracy of the sensor layer may be increased.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module may be physically separated into two or more interacting and discrete blocks, units and/or modules without departing from the scope of the disclosure. Further, the blocks, units and/or modules may be physically combined into more complex blocks, units and/or modules without departing from the scope of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic device, comprising:
   a display layer configured to display an image;
   a sensor layer disposed on the display layer and comprising a plurality of electrodes arranged in a first direction and a plurality of cross electrodes arranged in a second direction crossing the first direction; and
   a sensor driver configured to receive a sensitivity value from a node defined in an area where one of the plurality of electrodes intersects one of the plurality of cross electrodes, and to calculate an input coordinate based on the sensitivity value,
   wherein, when the sensitivity value received from the node is equal to or greater than a first threshold value, the sensor driver is configured to calculate the input coordinate based on the sensitivity value,
   wherein, when each of a plurality of sensitivity values received from the node and a plurality of peripheral nodes disposed adjacent to the node is less than the first threshold value and greater than or equal to a second threshold value different from the first threshold value, the sensor driver is configured to calculate the input coordinate based on the plurality of sensitivity values,
   wherein the sensitivity value is one of the plurality of sensitivity values,
   wherein the sensor driver comprises:

an average calculator configured to calculate an average sensitivity value of the sensitivity values received from the node and the plurality of peripheral nodes;

a weight calculator configured to calculate weights of the node and the plurality of peripheral nodes based on the average sensitivity value; and a coordinate calculator configured to calculate the input coordinate by reflecting the weights from a center of the node and centers of the plurality of peripheral nodes, respectively.

2. The electronic device of claim 1, wherein a number of the node and the plurality of peripheral nodes is 4.

3. The electronic device of claim 1, wherein the plurality of peripheral nodes comprises a first peripheral node, a second peripheral node, and a third peripheral node, and wherein the first peripheral node is disposed adjacent to the node in the first direction, the second peripheral node is disposed adjacent to the node in the second direction, and the third peripheral node is disposed adjacent to the first peripheral node in the second direction and disposed adjacent to the second peripheral node in the first direction.

4. The electronic device of claim 1, wherein each of the weights is calculated using an equation: weight=(sensitivity value−average sensitivity value)*(PT/average sensitivity value), wherein the PT is a pitch between the plurality of electrodes.

5. The electronic device of claim 4, wherein a distance between a position of the input coordinate and a center of the node, and a distance between the position of the input coordinate and a center of each of the plurality of peripheral nodes, are greater than 0, and are less than a value obtained by multiplying the PT by a square root of 2.

6. The electronic device of claim 1, wherein a position of the input coordinate is spaced apart from the center of the node in a direction toward the plurality of peripheral nodes.

7. The electronic device of claim 1, wherein the sensor driver comprises:

a determination circuit configured to determine whether the sensitivity value received from the node is less than the first threshold value and greater than or equal to the second threshold value, wherein, when the sensitivity value is less than the first threshold value and greater than or equal to the second threshold value, the input coordinate is calculated based on sensitivity values received from the node and the plurality of peripheral nodes.

8. The electronic device of claim 1, wherein the second threshold value is less than the first threshold value and equal to or greater than about ⅔ of the first threshold value.

9. A method of driving an electronic device, the method comprising:

receiving a plurality of sensitivity values of a plurality of nodes from a sensor layer comprising the plurality of nodes, a plurality of electrodes arranged in a first direction, and a plurality of cross electrodes arranged in a second direction intersecting the first direction, wherein each of the plurality of nodes is defined by an area in which one electrode of the plurality of electrodes intersects one cross electrode of the plurality of cross electrodes;

determining whether each of the plurality of sensitivity values is less than a first threshold value and greater than or equal to a second threshold value, wherein the second threshold value is less than the first threshold value; and when each of four adjacent sensitivity values among the sensitivity values respectively received from four adjacent nodes among the plurality of nodes is less than the first threshold value and greater than or equal to the second threshold value, calculating an input coordinate based on the four adjacent sensitivity values, and wherein the input coordinate is calculated by reflecting weights from centers of the four adjacent nodes, respectively.

10. The method of claim 9, further comprising:

calculating the input coordinate based on sensitivity values equal to or greater than the first threshold value among the sensitivity values.

11. The method of claim 9, wherein calculating the input coordinate comprises:

calculating an average sensitivity value of the four adjacent sensitivity values respectively received from the four adjacent nodes;

calculating four weights of the four adjacent nodes based on the average sensitivity value; and calculating the input coordinate based on the four weights.

12. The method of claim 11, wherein each of the weights is calculated using an equation: weight=(sensitivity value−average sensitivity value)*(PT/average sensitivity value), wherein the PT is a width of each of the plurality of nodes.

13. The method of claim 9, wherein the second threshold value is less than the first threshold value and equal to or greater than about ⅔ of the first threshold value.

14. The method of claim 9, wherein the four adjacent nodes comprise a node, a first peripheral node, a second peripheral node, and a third peripheral node, and wherein the first peripheral node is disposed adjacent to the node in the first direction, the second peripheral node is disposed adjacent to the node in the second direction, and the third peripheral node is disposed adjacent to the first peripheral node in the second direction and disposed adjacent to the second peripheral node in the first direction.

15. An electronic device, comprising:

a display layer configured to display an image;

a sensor layer disposed on the display layer and comprising a plurality of nodes, a plurality of electrodes arranged in a first direction, and a plurality of cross electrodes arranged in a second direction intersecting the first direction, wherein each of the plurality of nodes is defined by an area in which one electrode of the plurality of electrodes intersects one cross electrode of the plurality of cross electrodes; and a sensor driver configured to receive a sensitivity value from each of the plurality of nodes, and to calculate an input coordinate based on the sensitivity value, wherein, when the sensitivity value is equal to or greater than a first threshold value, the sensor driver is configured to calculate a first input coordinate based on the sensitivity value, and wherein, when the sensitivity value is less than the first threshold value and greater than or equal to a second threshold value different from the first threshold value, the sensor driver is configured to calculate a second input coordinate based on the sensitivity value, and peripheral sensitivity values received from a plurality of peripheral nodes disposed adjacent to a node providing the sensitivity value among the plurality of nodes, wherein the sensor driver comprises:
- an average calculator configured to calculate an average sensitivity value of the sensitivity value and the peripheral sensitivity values;
- a weight calculator configured to calculate weights of the node and the plurality of peripheral nodes based on the average sensitivity value; and
- a coordinate calculator configured to calculate the second input coordinate by reflecting the weights from a center of the node and centers of the plurality of peripheral nodes, respectively.

16. The electronic device of claim 15, wherein each of the weights is calculated using an equation: weight=(sensitivity value−average sensitivity value)*(PT/average sensitivity value), wherein the PT is a width of each of the plurality of nodes.

17. The electronic device of claim 15, wherein the second threshold value is less than the first threshold value and equal to or greater than about ⅔ of the first threshold value.

* * * * *